Dec. 23, 1952   H. L. BONE ET AL   2,622,451
DRIVING MECHANISM

Filed March 27, 1948   5 Sheets-Sheet 1

Fig. 1.

INVENTORS
Herbert L. Bone, John W. Logan Jr.
and William R. Gracey Jr.
BY
THEIR ATTORNEY

Fig. 2.

INVENTORS
Herbert L. Bone, John W. Logan Jr.
and William R. Gracey Jr.
BY
THEIR ATTORNEY

Fig. 3.

INVENTORS
Herbert L. Bone, John W. Logan Jr.
and William R. Gracey Jr.
BY

THEIR ATTORNEY

Dec. 23, 1952   H. L. BONE ET AL   2,622,451
DRIVING MECHANISM
Filed March 27, 1948   5 Sheets-Sheet 4

INVENTORS
Herbert L. Bone, John W. Logan Jr.
and William R. Gracey Jr.
BY
THEIR ATTORNEY Dec. 23, 1952 H. L. BONE ET AL 2,622,451
DRIVING MECHANISM
Filed March 27, 1948 5 Sheets-Sheet 5

INVENTORS
Herbert L. Bone, John W. Logan Jr.
and William R. Gracey Jr.
BY
THEIR ATTORNEY Patented Dec. 23, 1952

2,622,451

UNITED STATES PATENT OFFICE 2,622,451

DRIVING MECHANISM

Herbert L. Bone and John W. Logan, Jr., Forest Hills, and William R. Gracey, Jr., Swissvale, Pa., assignors to Westinghouse Air Brake Company, a corporation of Pennsylvania Application March 27, 1948, Serial No. 17,414

3 Claims. (Cl. 74—421)

Our invention relates to driving mechanism and particularly to driving mechanism for railway apparatus.

Certain features of our invention are of particular utility in connection with driving mechanism for apparatus mounted along the trackway of a railway. Certain other features of our invention are of particular utility in connection with driving mechanism for a load device which is required to be driven in opposite directions between two extreme positions. Still other features of our invention are of particular utility in connection with electric driving mechanism generally.

Our invention is shown and described herein as it may be used as a driving mechanism for two torpedo signal machines of the type described and claimed in Letters Patent of the United States No. 2,362,347, granted to Herbert L. Bone and Kenneth J. J. McGowan on November 7, 1944.

Electric drive mechanisms for use in connection with railway wayside apparatus usually comprise three units, namely, an electric motor, a speed reduction gearing, and an electric circuit controller for operating control or indication contacts in accordance with the position of the driven device. Such mechanisms are required to operate reliably for long periods of time with a minimum of inspection or maintenance. They must operate reliably under adverse and variable weather conditions. Furthermore, when repairs are necessary, the mechanism must be arranged so that the repairs can be made without taking the machine out of service for any appreciable time. It is also required that apparatus of this type have a low over-all height, so that it may be mounted along the rails or even between the rails without danger of fouling the passing vehicles.

The usual devices which are operated by a drive mechanism of the type here described are driven between two extreme positions. This is true of torpedo signal machines, certain types of visual signals, and other devices. Where an electric motor is used to drive such a device, a speed reduction gearing is commonly used between the motor and the driven device because of the characteristic high speed of electric motors. A driven device of the type described is required to move positively from one of its extreme positions to the other and then stop at the other position with no further movement. An electric motor driving a device of this sort through a reduction gearing approaches the end of the stroke of the driven device with a considerable inertia because of its high speed. This inertia tends to keep the motor rotating, and if the motor is required to stop suddenly, the motor inertia may deliver a considerable impact to the driven device and other operating parts of the mechanism. It is therefore desirable to provide, in connection with the reduction gearing, a lost motion connection which permits the motor to continue rotating under the influence of its own inertia after the driven device has reached the end of its operating stroke. The driven device must, however, be locked in its end position, and must not be permitted to move in spite of the fact that the motor may move independently because of the lost motion connection.

Electric motors adapted for mounting along the trackway of a railway are subjected to severe vibration conditions. This vibration may cause the motor to "creep" or move slowly without electrical energization. This creeping must be prevented from affecting the position of the device driven by the motor.

It is therefore an object of our invention to provide an improved driving mechanism for railway wayside apparatus. Another object is to provide an improved housing structure for such mechanism.

Another object is to provide a driving mechanism of the type described including motor and circuit controller units which may be removed and replaced as units without taking the entire mechanism out of service.

A further object is to provide an improved motor mounting arrangement of general utility.

A further object is to provide an improved circuit controller structure of general utility.

A further object is to provide improved driving mechanism for a device movable between two extreme positions. Another object is to provide driving mechanism of the type described including an electrical motor and improved means for permitting coasting of the motor at the end of the operating stroke of the driven device. Another object is to provide for improved mechanism for locking the driven device during such coasting of the motor.

Another object is to provide improved mechanism for preventing creeping of a motor from affecting the position of a driven device.

Another object is to provide improved driving mechanism for simultaneously positioning a plurality of torpedo signal machines.

We accomplish these objects of our invention by providing a housing having a transverse recess in its bottom so that the housing fits over a railway tie. Transverse walls are provided within the housing, dividing it into three compartments, the central compartment being over the tie, and the two end compartments being deeper and extending downwardly between the ties when the housing is mounted alongside the track.

A removable motor unit is placed in one of the deep end compartments. A shaft extending through the center compartment connects the motor to a reduction gearing located in the opposite deep end compartment. An electric circuit controller is located in the relatively shallow center compartment, and is driven by a shaft which extends into the gearing compartment and is driven by the gearing. The shaft connecting the two end compartments passes freely through the transverse wall separating the motor compartment and the controller compartment, and is journaled in the wall which separates the controller and gearing compartment.

The motor unit includes an electric motor, a casing, a pinion driven by the motor and extending outside the casing, and a bearing in the casing for the shaft which extends between the motor and gearing compartment. This shaft carries a gear which engages the motor pinion. In this way, the spacing between the motor shaft and the gear shaft is determined by the structure of the motor casing itself, and is not affected by replacement of the motor. Furthermore, minor changes in the position of the motor and of the shaft due to replacement of the motor do not substantially affect the position of the shaft inside the gearing compartment, since it is journaled in the closely adjacent transverse wall. The shaft is sufficiently long so that its flexibility may take up such minor misalignment.

The gearing includes a final drive gear carrying a pin which moves in a slot in an arm fixed on a drive shaft which extends outside the housing and is connected to the torpedo signal or signals or other driven device. The construction is such that the pin reaches one particular end of the slot at both extreme positions of the driven shaft. That end of the slot is so constructed as to permit continued movement of the motor after the pin has reached that end of the slot without moving the final drive shaft. Provision is also made for locking the drive shaft during this continued movement of the motor.

Two modifications of this lost motion connection and locking means are shown. In the preferred modification, the slot in the driven arm has a wide portion at the end reached by the pin when the arm is in either of its extreme positions. This wide portion is formed with two opposed arcuate sides. Each arcuate side is concentric with the final gear that carries the pin when the arm is in one of its extreme positions. Therefore, when the pin moves along that arcuate side, it does not produce any movement of the arm. Furthermore, it prevents movement of the arm in one direction. The arm is locked against movement in the opposite direction by a stationary stop adjusted to engage the arm when it reaches its extreme position. The other arcuate side of the slot and another stationary stop are similarly effective in the opposite extreme position of the arm.

In the second modification of the lost motion connection and driven arm locking means, the slot in which the pin moves is completely open at one end, so that when the pin reaches that end of the slot, the slot no longer confines it and permits free movement of the pin and the motor. The locking mechanism in this case consists of two arcuate cam ridges on the final gear and a pair of spaced lugs on the driven arm. When the arm reaches one extreme position, the lugs straddle one of the ridges so as to prevent movement of the arm. When the arm reaches its opposite extreme position, the same lugs straddle the other cam.

The final gear is provided with a pair of anti-creeping cams which are driven positively past a stationary spring detent just before the gear reaches either of its positions corresponding to the extreme positions of the arm. After the motor has coasted to a stop, it may freely creep within the range of movement beyond the extreme position of the driven arm, but the creeping is prevented by the detent and the cams from causing movement of the driven arm.

The circuit controller operating shaft is that on which the final driven gear is fixed. This shaft extends across the circuit controller compartment, and carries a plurality of cams in that compartment. A unitary contact assembly is mounted above the cams. This assembly consists of a pair of insulating blocks located on opposite sides of the cams and extending parallel with the cam shaft. The ends of these blocks are fastened together by a pair of straps. On one block is mounted a row of contact fingers which extend over the cams. Each finger carries an insulating follower for engagement with its associated cam. The other insulating block carries a row of stationary contacts which extend into the path of the contact fingers. The straps and the insulating blocks are attached together for removal as a unit. The unit is mounted in the casing by means of four mounting screws at each of the four corners of the unit. The strap nearest the motor compartment carries a wire guide consisting of a channel-shaped member with the open part of the channel facing upwardly. The wires attached to the several terminals associated with the contacts and contact fingers are led along their respective insulating blocks and then through the opposite ends of this channel-shaped member. The outer side of the channel-shaped member is higher than the inner side and is provided with a wire outlet opening. The wires extend through this opening into the motor compartment. A box-like cover is provided for the contact assembly. This cover is hinged on one of the insulating blocks and is provided on its opposite edge with a pair of latches which yieldably engage the other insulating block. The end of the cover nearest the motor compartment is apertured for passage of the wires extending through the wire outlet in the channel-shaped member. By detachment of the wires and the four mounting screws, the entire contact assembly and the cover may be removed and replaced as a unit. Also, if it is desired to repair or maintain the cams, the wires need not be detached, but only the four mounting screws are removed. The entire contact assembly including its cover may then be lifted to one side to permit free access to the cams.

Other objects and advantages of our invention will become apparent as the description proceeds.

We shall describe one form of driving mechanism and two forms of lost motion connection, each with its associated locking means for locking the driven device, and shall then point out the novel features of our invention in claims.

In the accompanying drawings.

Figure 1:
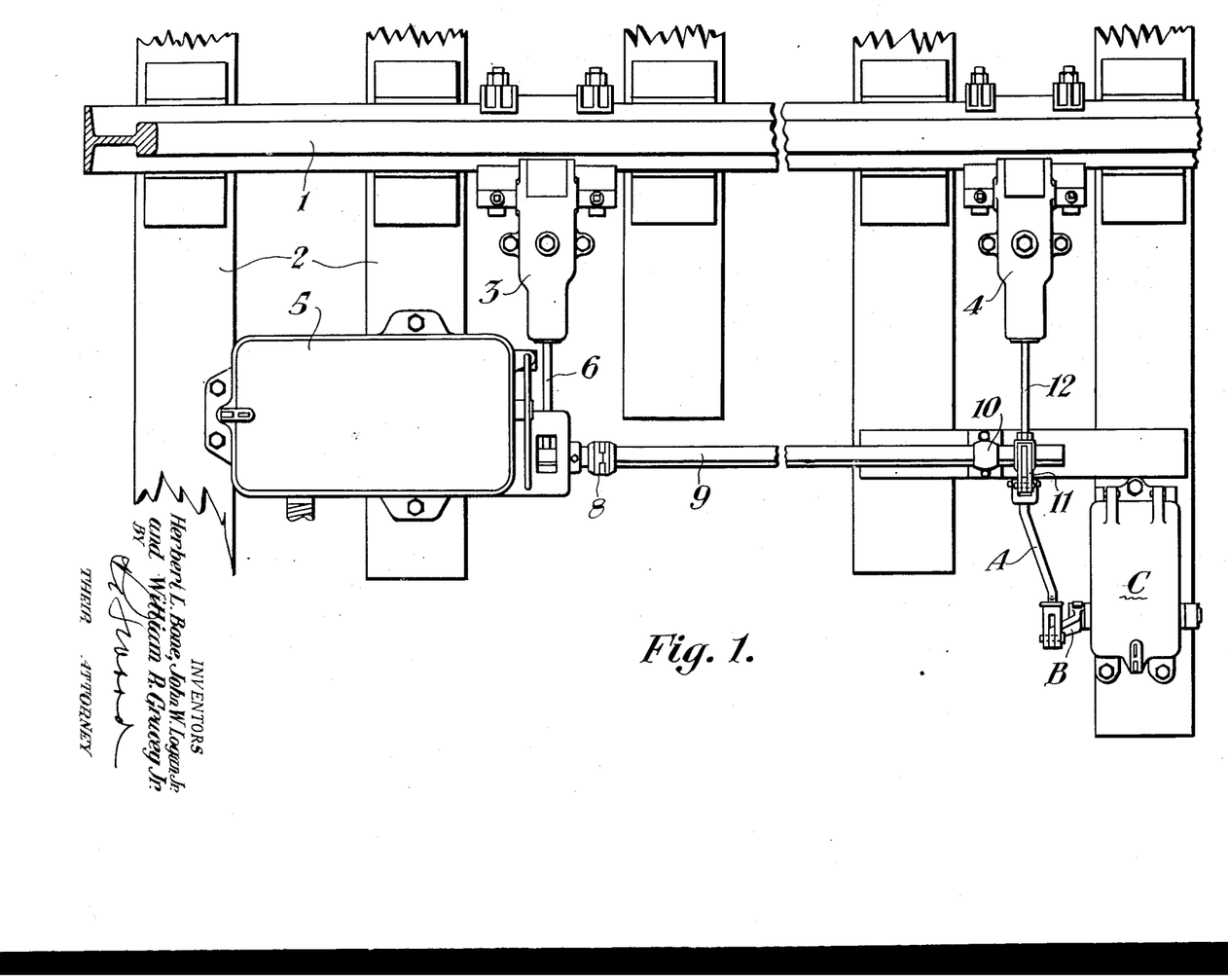
Fig. 1 is a track layout illustrating the use of our electric driving mechanism in connection with two torpedo machines.

Referring to Fig. 1, there is shown a stretch of railway track including a rail 1 mounted in the usual manner on a series of ties 2. A pair of torpedo signal machines 3 and 4 are attached to the rails at spaced points. These machines may be of the type shown and claimed in the patent to Bone and McGowan No. 2,362,347, previously referred to, to which patent reference is made for the purpose of a more complete disclosure of the structure of these signal machines.

For the purposes of the present invention, it is believed sufficient to state that each of these torpedo signal machines is movable between a firing position in which it fires a torpedo when a vehicle passes over it and a clear position in which it does not fire a torpedo. The torpedo signal machines 3 and 4 are simultaneously operated by an electric driving mechanism generally indicated at 5. The signal machine 3 is connected through a driving link 6 to a crank arm 7 (see Fig. 2), attached to a drive shaft 8 on the driving mechanism 5.

An extension shaft 9 is drivingly connected to the drive shaft 8, and is supported in a suitable bearing 10. The extension shaft 9 extends to a point opposite the torpedo signal machine 4, where it carries a crank arm 11 connected to the torpedo signal machine 4 by a driving link 12.

Link 12 is also connected through a link A with the driving arm B of an electric circuit controller C. The controller C may, for example, be of the type described in Letters Patent of the United States No. 2,190,520, granted to Edwin G. Little on February 13, 1940, for Circuit Controller. Such a controller is used in conjunction with a torpedo machine of the type described, for purposes explained in the Bone and McGowan Patent No. 2,362,347, previously referred to.

Figure 2:
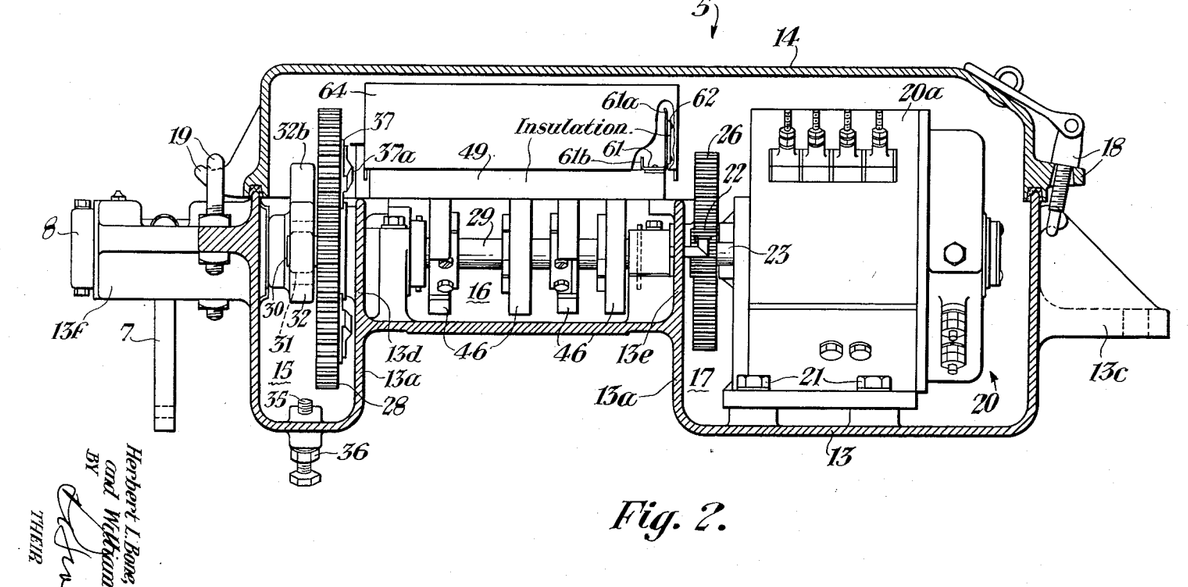
Fig. 2 is an elevational view of a driving mechanism embodying our invention, with the side of the housing removed to illustrate the internal construction.
Figure 3:
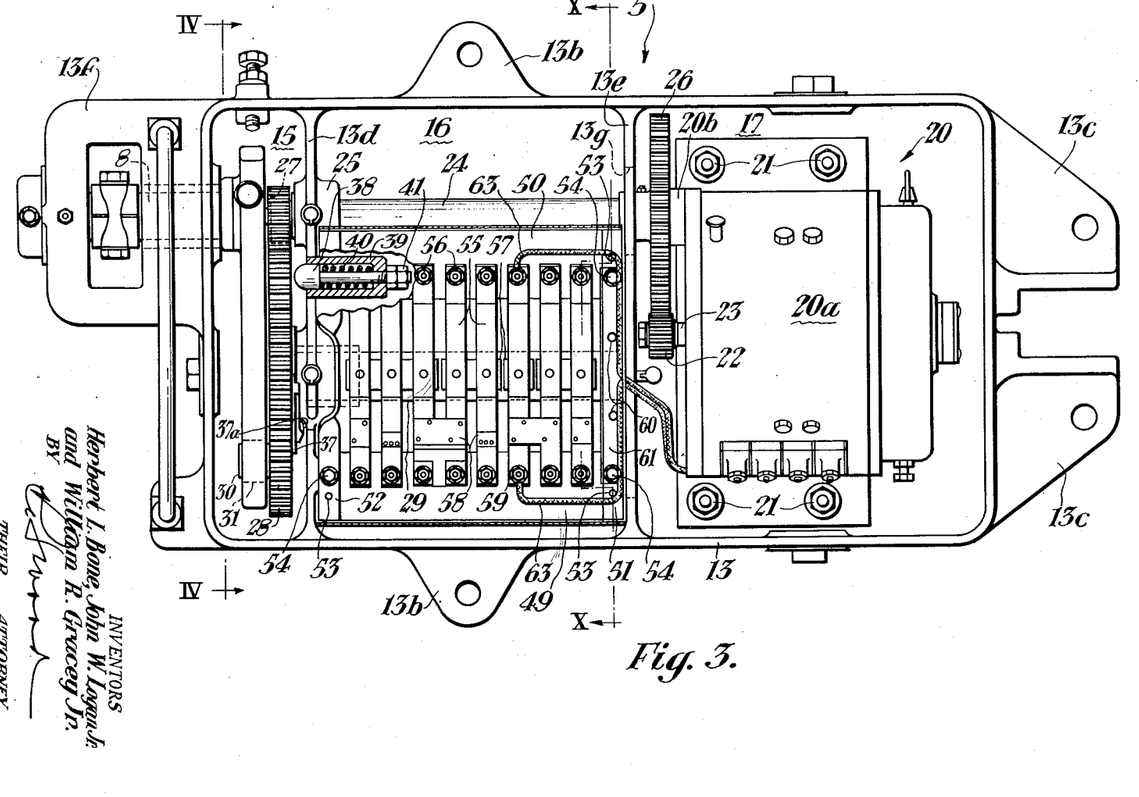
Fig. 3 is a plan view of the drive mechanism of Fig. 2, with the housing cover removed and with the inside cover over the circuit controller removed.
Figure 4:
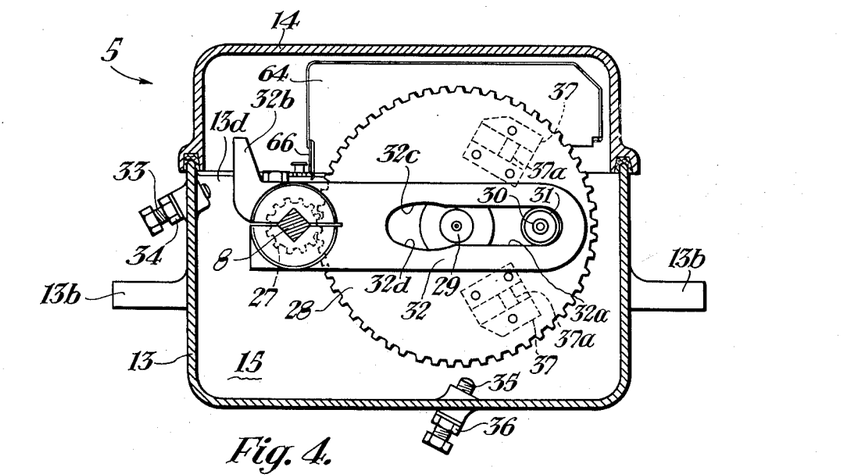
Fig. 4 is a cross sectional elevation taken on the line IV—IV of Fig. 3, looking in the direction of the arrow, illustrating particularly the lost motion connection and locking mechanism.

The electric drive mechanism 5 is illustrated in detail in Figs. 2, 3, and 4. It may there be seen that the drive mechanism includes a housing 13 having a cover 14. The housing 13 is provided with a transverse recess 13a in its bottom, which recess is of the proper size to fit over a railway tie. The casing 13 is provided with a pair of mounting lugs 13b adapted for attachment by means of bolts to the tie received in the recess 13a. One end of the casing has another pair of mounting lugs 13c adapted to be mounted to the next adjacent tie.

Formed integrally with the housing 13 are two interior transverse walls 13d and 13e, which divide the interior of the housing into three compartments 15, 16, and 17. The walls 13d and 13e are aligned with the ends of the recess 13a, so that the compartment 16 overlies the recess and is therefore somewhat shallower than the end compartments 15 and 17. The latter two compartments extend downwardly into the spaces between the railway ties when the housing is mounted in position on the tie. One end of the housing 13 is provided with an integral extension 13f, which carries inboard and outboard bearings for the shaft 8. The inboard bearing for the shaft 8 extends into the end wall of the housing 13.

The housing 13 and cover 14 are provided at one end with cooperating latch members 18 (see Fig. 2) and at their opposite ends with cooperating hinge members 19, of conventional construction.

A motor unit 20 having a casing 20a is removably mounted in the compartment 17 of housing 13 by four bolts 21. An electric motor in the motor unit 20 drives a pinion 22, which is mounted on a shaft 23 extending outside the casing 20a.

A shaft 24 (see Fig. 3) extends between the end compartments 15 and 17. The shaft 24 is journaled in a bearing 25 carried by the transverse wall 13d, and passes freely through an opening 13g in the transverse wall 13e. A gear 26 is fixed on the shaft 24 inside the compartment 17. The gear 26 engages the motor driven pinion 22. The end of shaft 24 within the compartment 17 is journaled in a bearing 20b formed in the casing 20a of motor unit 20.

The pinion 22 is made wider than the axial length of the end of shaft 24 which is received in bearing 20b. When it is desired to remove the motor unit 20 from the housing 13, the bolts 21 are first removed. The motor unit 20 may then be moved endwise to disengage the shaft 24 from bearing 20b. After that disengagement is completed, the motor unit 20 may be moved either endwise or laterally to disengage the pinion 22 from gear 26. When a new motor unit is being mounted in the housing 13, it must first be moved laterally so as to engage pinion 22 with gear 26. This may be accomplished before the shaft 24 is aligned with bearing 20b because, as mentioned above, the pinion 22 is wider than the end of shaft 24 to be received in bearing 20b. After the pinion 22 and gear 26 are engaged, the motor unit 20 may then be shifted to align the bearing 20b with the shaft 24, and may then be moved endwise to insert the shaft end in the bearing. Since the shaft 24 is not rigidly fastened to the casing at any point near the motor unit 20, its flexibility will take up any small angular misalignment in the mounting of the motor unit. However, since the opposite end of shaft 24 is journaled in the bearing 25, the end of shaft 24 within the compartment 15 will not have its position changed appreciably by a small adjustment in the position of the motor end of the shaft.

Inside the compartment 15 is mounted a suitable reduction gearing mechanism for connecting the shaft 24 to the drive shaft 8. The drive shaft 8 and the shaft 24 are in axial alignment, although they are structurally separate. The end of shaft 24 inside compartment 15 carries a gear 27 which engages a gear 28 fixed on a shaft 29. The shaft 29 extends from the compartment 15 through the compartment 16, where it operates a circuit controller to be later described.

The gear 28 carries a pin 30 which rotatably supports a roller 31. A crank arm 32 is fixed on the shaft 8. The arm 32 is provided with a slot 32a in which the pin 30 and roller 31 move.

As gear 28 rotates, the pin 30 and roller 31 rotate the arm 32 and thereby the drive shaft 8, and the pin and roller at the same time move longitudinally in the slot 32a. The arm 32 is provided at one end with an upstanding lug 32b, which limits the rotation of arm 32 in a counterclockwise direction, as viewed in Fig. 4, by engagement with a stop bolt 33. The bolt 33 passes through a suitable lug in the housing 13 and is locked in position by means of a lock nut 34. Movement of arm 32 in a clockwise direction is similarly limited by a stop bolt 35 locked by a lock nut 36. The stop bolt 35 directly engages one side of the arm 32.

The motor 20 is arranged to be deenergized by contacts in the circuit controller in compartment 16 whenever the shaft 29 and gear 28 rotate to a position corresponding to one of the extreme positions of arm 32. The particular circuit used for controlling the motor is not a part of the present invention. For example, the circuit shown in Fig. 4 of the copending application for Letters Patent of the United States of Robert M. Gilson, Serial No. 11,974, filed February 28, 1948, may be used.

Figure 5:
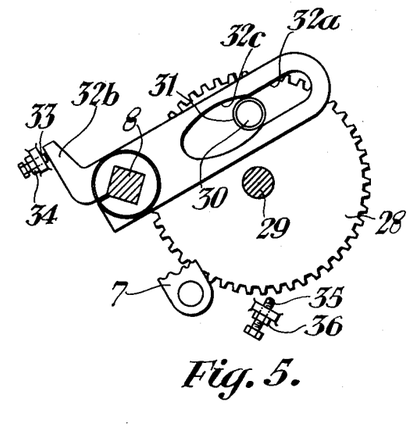
Figs. 5 and 6 are views generally similar to Fig. 4, but more diagrammatic, illustrating the lost motion connection and locking mechanism in different operating positions.

If the motor 20 is rapidly rotating at the time it is deenergized, it is desirable to allow free movement of the motor after the member 32 reaches its extreme position, so that the parts of the mechanism will not be subjected to impact or shock due to the inertia of the motor. Such free movement of the motor 20 is permitted by providing the sides of the slot 32a with arcuate contours, as illustrated at 32c and 32d. Referring to Fig. 5, which shows the crank arm 32 in its upper extreme position, it may be seen that the arcuate portion 32c of the slot is concentric with the shaft 29 when the arm 32 is at that extreme position. Similarly, by referring to Fig. 6, it may be seen that the arcuate portion 32d of the slot is concentric with the shaft 29 when the crank arm 32 is at the opposite extreme position.

The motor controlling circuits are so arranged that when the motor drives the gear 28 counterclockwise as viewed in Fig. 5, it is deenergized just as the pin 30 reaches the position shown in that figure, where it is just beginning to engage the arcuate portion 32c of the slot. The motor, acting under the influence of its own inertia, may continue to rotate gear 28 counterclockwise. Such rotation moves pin 30 and roller 31 along the arcuate portion 32c of slot 32a. Since arcuate portion 32c is at this time concentric with the path of movement of pin 30 and roller 31, no torque is transmitted from the pin and roller to arm 32 by this movement. Counterclockwise rotation of gear 28 may continue until pin 30 and roller 31 engage the extreme left end of slot 32a whereupon further rotation in that direction is prevented. However, the length of the slot is designed so that substantially all the kinetic energy in the motor is dissipated by the time the pin reaches the end of the slot, so that the stopping of the motor then takes place without undue shock.

Figure 6:
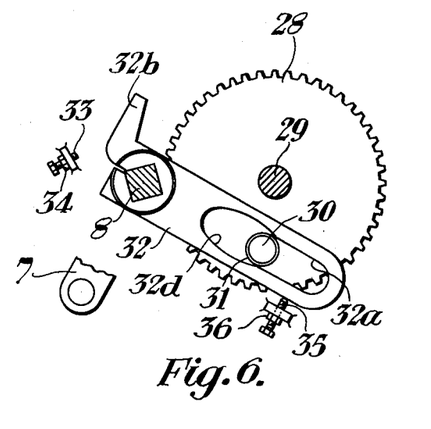

Similarly, when the motor is traveling clockwise, and the parts reach the position shown in Fig. 6, the gear 28 may continue to rotate clockwise, thereby moving the pin 30 and roller 31 along the arcuate portion 32d of the slot without transmitting any torque to the arm 32.

It should be noted that the portions 32c and 32d of the slot are not only effective to permit free movement of the motor 20 and its gear crank after arm 32 reaches either of its extreme positions, but that these portions of the slot cooperate with the stop bolts 33 and 35 to lock the arm 32 in its extreme positions so that it cannot be moved by externally applied forces while the motor is coasting. Referring to Fig. 5, it may be seen that counterclockwise movement of arm 32 is prevented by the engagement of lug 32b with stop bolt 33, and that clockwise movement of arm 32 is prevented by the engagement of slot portion 32c with the roller 31. In Fig. 6, clockwise motion of arm 32 is prevented by its engagement with stop 35, while counterclockwise motion of arm 32 is prevented by engagement of slot portion 32d with roller 31. The slot portions 32c and 32d therefore form not only an essential part of a lost motion connection between the motor and the drive shaft 8, but they also form an essential part of a mechanism for locking the drive shaft 8 in its extreme positions.

Means are provided for preventing the motor from creeping during its periods of deenergization so as to cause movement of the arm 32. This means includes a pair of detent cam plates 37 (see Fig. 4) carried on the face of gear 28 opposite the arm 32. Each of the detent cam plates 37 is provided with a raised ridge 37a which cooperates with a stationary detent 38 (see Fig. 3). The detent 38 is received in a housing 39 mounted on the transverse wall 13d of the main housing 13. A spring 40 biases the detent 38 for movement outwardly of the housing 39 toward the gear 28. Such outward movement is limited by a nut 41 threaded on the shank of detent 38, which passes completely through the housing 39.

The cam plates 37 are so arranged that one passes the detent 38 just before the motor is deenergized as the arm 32 reaches each extreme position. The spring 40 of the detent is strong enough to prevent creeping of the motor due to vibration from driving the ridge 37a past the detent. However, this spring is not strong enough to prevent the motor, when energized, from driving the ridge of the cam past the detent. Therefore, after the motor has driven the ridge 37a past the detent and has been deenergized, creeping of the motor cannot thereafter cause the arm 32 to change its position. That arm position cannot be changed until the motor is energized for operation in the opposite direction, whereupon the ridge 37a is driven past the detent 38 by the motor.

Figure 7:
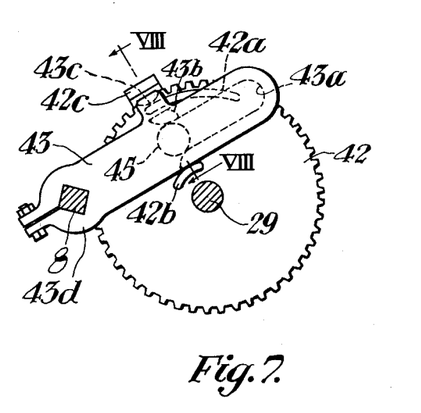
Fig. 7 is an elevational view, somewhat diagrammatic, showing a modified form of lost motion connection and locking mechanism.
Figure 8:
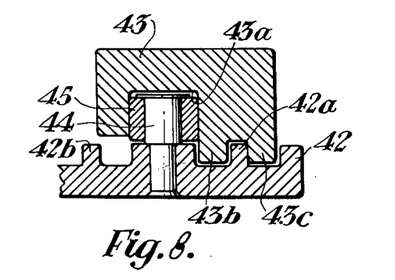
Fig. 8 is a cross sectional view taken on the line VIII—VIII of Fig. 7.
Figure 9:
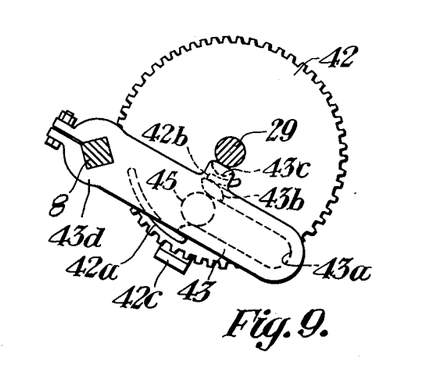
Fig. 9 is a view generally similar to Fig. 7, showing the parts in a different position.

Figs. 7, 8, and 9 illustrate somewhat diagrammatically a different arrangement which provides a lost motion connection between the motor and the drive shaft and which locks the drive shaft in its extreme position. Referring the Figs. 7, 8, and 9, there is shown a gear 42 corresponding generally to the gear 28 of Figs. 2 to 6, inclusive, and cooperating with a crank arm 43 fixed on the shaft 8 and corresponding generally to the crank arm 32 of Figs. 2 to 6, inclusive. As shown in Fig. 8, the gear 42 carries a pin 44 provided with a roller 45 and corresponding respectively to the pin 30 and roller 31 of Figs. 2 to 6, inclusive. The arm 43 is provided in its surface adjacent the gear 42 with a groove 43a, in which the roller 45 travels. The groove 43a corresponds generally to the slot 32a of Figs. 2 to 6, inclusive. However, the end of groove 43a nearest the drive shaft 8 is completely open, so that when the arm 43 reaches either extreme position, the roller 45 may pass freely out of the groove, thereby providing the required lost motion connection. The gear 42 is provided with a stop arm 42c, which determines the limit of rotation of gear 42 by its engagement with the hub of arm 43.

The crank arm 43 is also provided with a pair of cam lugs 43b and 43c. These cam lugs 43b and 43c extend toward the gear 42 beyond the side of the groove 43a, so that they may engage either of a pair of concentric cam ridges 42a and 42b on the gear 42. These ridges 42a and 42b are lower than the pin 44 and roller 45, so that they do not engage any part of the crank arm 43 other than the cam lugs 43b and 43c. The cam ridges 42a and 42b are concentric with the shaft 29 on which the gear 42 is fixed, so that their engagement with the cam lugs 43b and 43c does not impart any rotational movement to the crank arm 43, but on the other hand locks the crank arm 43 against rotation.

Figs. 7 and 8 illustrate the position of the parts when the crank arm 43 is in one extreme position, and Fig. 9 shows the position of the parts when the crank arm is in its opposite extreme position.

Figure 10:
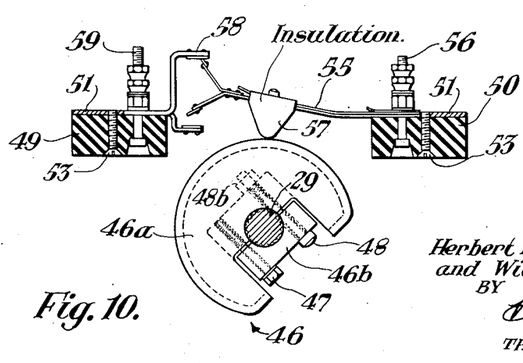
Fig. 10 is a cross sectional view of the line X—X of Fig. 3, with certain parts omitted, illustrating a detail of the circuit controller.

The circuit controller is best illustrated in Figs. 2, 3, 10, and 11. This circuit controller includes a number of cams 46 carried by the shaft 29 inside the central compartment 16 of the housing. These cams 46 are of conventional construction, and are arranged to be angularly adjustable on the shaft 29. As best shown in Fig. 10, each cam 46 comprises two sections 46a and 46b, which are clamped together over the shaft 29 by means of a locking screw 47. The angular positions of the cams with respect to shaft 29 may be adjusted by loosening their respective locking screws 47, and rotating their respective adjusting screws 48. These adjusting screws are freely received in the suitable apertures in the cam sections 46a and 46b, and threadedly engage threads cut in periphery of shaft 29. The screws 48 are prevented from moving endwise in the cams by their heads and by nuts 48b, which are locked to the screws 48 by suitable means such as cotter pins. When the locking screw 47 is released, the cam assembly may be rotated with respect to shaft 29 by turning the adjusting screw 48, thereby advancing it around the periphery of the shaft 29.

Above the shaft 29 and the cams 46 is mounted a removable contact assembly including two insulating blocks 49 and 50 which extend parallel to the shaft 29 and whose opposite ends are connected by straps 51 and 52. The straps and the insulating blocks are connected by screws 53 which extend upwardly through the blocks 49 and 50 and threadedly engage the strap 51. The insulating blocks 49 and 50 and the straps 51 and 52 form a rectangular frame. This frame is mounted by means of screws 54 on suitable lugs provided on the transverse walls 13d and 13e of the housing 13.

A plurality of parallel contact fingers 55 are attached to the insulating block 50 by means of terminal posts 56 of conventional construction. Each contact finger 55 carries a cam follower 57 which engages one of the cams 46 on shaft 29. The free end of each contact finger 55 cooperates with one or more stationary contacts 58 attached by means of conventional terminal posts 59 to the insulating block 49.

Attached to the strap 51 by means of rivets 60 is a channel-shaped member 61 having the open side of the channel facing upwardly. The outer flange 61a (see Figs. 2 and 11) of the channel-shaped member 61 is higher than the inner flange 61b. The outer flange 61a is provided with an aperture which serves as a wire outlet 61c. On the outside of the flange 61a is mounted an insulating plate 62 having an aperture 62a aligned with and smaller than the aperture 61c in the flange 61a. Wires 63 (only two of which are shown in Fig. 3) extend to the right as shown in the drawings from their respective terminal posts 56 and 59 to the ends of their respective insulating blocks, where they are bent to pass through the channel-shaped member 61 and out through the wire outlet aperture 61c. The inner flange 61b of the channel-shaped member 61 protects the wires from accidental engagement with the adjacent contact finger 55.

Figure 11:
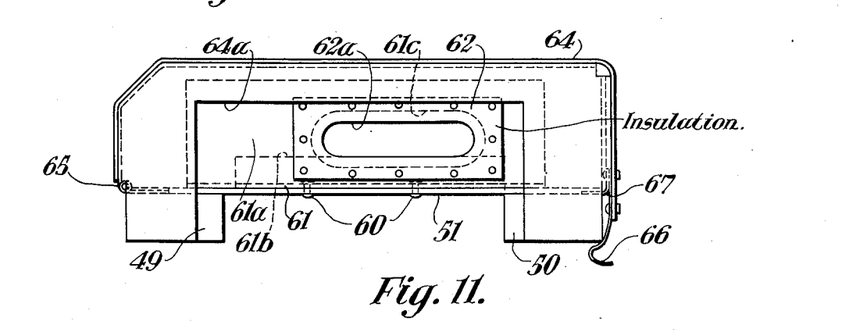
Fig. 11 is an end elevational view of one end of the circuit controller cover.

The contact assembly of the circuit controller is provided with a cover 64. One edge of the cover is provided with a hinge 65 which is attached to the insulating block 49. The opposite edge of the cover 64 is provided with one or more spring fingers 66 which are adapted to latch over the opposite insulating block 50. A stop finger 67 associated with the spring finger 66 prevents that edge of the cover from moving downwardly too far over the insulating block 50. The end of the cover nearest the motor compartment 17 is provided with an aperture 64a. When the cover is in its closed position, the aperture 64a is aligned with the insulating plate 62 attached to the outside of flange 61a, as shown in Fig. 11.

It has been found that when a closed housing such as housing 13 is mounted in an exposed location, moisture will condense from time to time on the underside of the cover 14 because of external temperature changes. The cover 64 protects the contact assembly from falling drops of the condensed moisture.

If it is desired to repair or maintain cams 46, the entire contact assembly, with its cover 64 and its attached wires may be moved out of the way by simply removing the four mounting screws 53 at the corners of the contact assembly.

Various conventional means are provided for lubricating the various bearings in our drive mechanism. Some of these oil cups and other devices are illustrated in the drawings but are not specifically described herein. For lubrication of gear 28, a quantity of oil may be introduced into the compartment 15 of the housing, so that it extends above the level of the lower teeth of gear 28. Rotation of gear 28 will then serve to splash enough oil to lubricate that gear and the other parts of the drive mechanism located in that compartment. Cover 64 protects the contact assembly from oil splashing in the gearing compartment 15.

From the foregoing description, it should be apparent that we have provided an electric drive mechanism including a motor unit, a reduction gearing unit, and an electrical circuit controller unit. Since a low over-all height of the housing is required, the housing is adapted to straddle a railway tie, and its interior is divided into two deep end compartments and a shallow central compartment over the tie. The relatively high motor and gearing units are placed in the deeper end compartments, while the comparatively low circuit controller is mounted in the shallow central compartment. In this way, the space within the housing is economically used. Furthermore, each compartment is adapted to solution of specific problems as to lubrication, moisture protection, etc., which are occasioned by the particular device housed in that compartment.

Although we have herein shown and described only one form of driving mechanism, and two forms of lost motion connection embodying our invention, it is understood that various changes and modifications may be made therein within the scope of the appended claims without departing from the spirit and scope of our invention.

Having thus described our invention, what we claim is:

1. Driving mechanism including a support, a motor, a casing for the motor, means for detachably mounting the casing on the support, a pinion driven by the motor and extending outside the casing, a shaft journaled at one end on the support, a gear engageable by the pinion and fixed on the shaft, and a bearing for one end of the shaft in the motor casing so that the spacing between the pinion and the gear is fixed by the motor casing structure while the pinion and shaft bearing are readily disengageable from the gear and shaft respectively, upon detachment of the mounting means.

2. Driving mechanism as in claim 1, in which the pinion is wider than the axial length of the shaft end supported in the bearing so that during mounting of the motor casing the pinion may be engaged with the gear before the shaft end is inserted in the bearing.

3. Driving mechanism as in claim 1, including a second bearing for said shaft carried by the support at a point spaced from the motor casing so that the flexibility of the shaft may take up small misalignments between the motor casing and the support.

HERBERT L. BONE.
JOHN W. LOGAN, Jr.
WILLIAM R. GRACEY, Jr.

REFERENCES CITED

The following references are of record in the file of this patent:

UNITED STATES PATENTS

| Number | Name | Date |
|---|---|---|
| 562,086 | Livingstone | June 16, 1896 |
| 693,837 | Canedy | Feb. 25, 1902 |
| 726,867 | Clayton | May 5, 1903 |
| 959,039 | Abernathy | May 24, 1910 |
| 1,563,305 | Ambler | Nov. 24, 1925 |
| 1,596,518 | Eppley | Aug. 17, 1926 |
| 1,609,292 | Burch | Dec. 7, 1926 |
| 1,785,798 | Weiss | Dec. 23, 1930 |
| 1,875,229 | Falcke | Aug. 30, 1932 |
| 1,885,147 | Smith | Nov. 1, 1932 |
| 2,334,978 | Wood | Nov. 23, 1943 |
| 2,362,347 | Bone et al. | Nov. 7, 1944 |
| 2,399,906 | Bentley | May 7, 1946 |
| 2,455,089 | Perez | Nov. 30, 1948 |
| 2,476,195 | Horman | July 12, 1949 |